United States Patent Office 3,291,614
Patented Dec. 13, 1966

3,291,614
SOLUBLE DRY MILK PRODUCT AND A METHOD OF PRODUCING THE SAME
Leon Tumerman, Bay Shore, and Warren Y. Maddock, Westbury, N.Y., assignors to National Dairy Products Corporation, New York, N.Y., a corporation of Delaware
No Drawing. Filed Mar. 3, 1958, Ser. No. 718,454
31 Claims. (Cl. 99—56)

This invention relates to powders that are readily dispersible in cold water to form reconstituted edible beverages.

Numerous powdered products such as whole milk powder, cream powder, powdered ice cream mix and related dried products manufactured by conventional drying methods exhibit a pronounced resistance to dispersion in water and require high speed agitation or special mixing devices. The use of such devices for reconstitution is frequently unfeasible, as in military field application, and mechanical reconstitution of such powders does not always provide an adequate degree of resolubilization. Undissolved particles will often seriously detract from the taste, appearance and/or function of the final product. Moreover, the work involved in reconstituting poorly dispersible powders is often a deterrent to their wider acceptance. Self-dispersion, the capacity of the powder to be reconstituted with a minimum of agitation, is a highly valued powder characteristic which many processors have sought to build into their dried products.

In the case of non-fat dried milk, and related powders, improved dispersibility has been obtained in some cases by an increase in particle size beyond that normally obtained by previous drying methods, e.g., spray drying. Such large particle powders, produced by modified drying techniques or by recently developed agglomeration processes, possess improved dispersing properties. These methods, however, are of limited applicability and fail to impart self-dispersion properties to fat-containing powders such as dried whole milk, powdered ice cream mix, powdered cream and other related poorly wettable products of the class that are treated by the present invention. Extensive research efforts to devise alternate processes for improving the dispersibility of this important class of powders have been equally unsuccessful. Thus, preheat, homogenization, condensing and other pre-drying variables have been empirically modified to define optimum conditions for whole milk powder dispersibility. Similarly, modified drying processes including foam, belt and multiple spray methods have been proposed or submitted to test, but an instant dispersing powder has not been produced.

Numerous attempts have been made to improve powder dispersibility by the incorporation of wetting agents into the fluid product before drying. Such treatment affords only minor improvement and is attended by serious defects including fat churning, balling-up of the wet powder and reversion of wettability during dry storage. Furthermore, the amount of wetting agent required to grant even modest dispersibility improvement is excessive.

One object of the present invention is to produce a powder comprising a fat and water-soluble milk components that is rapidly and readily dispersible in water at a temperature below the melting point of fat.

Another object of the invention is to produce a powdered whole milk that is rapidly dispersible in cold water.

Still another object of the invention is to prepare a readily dispersible powder of the type heretofore mentioned that will rapidly disperse in cold water with a minimum of agitation.

Still other objects of the invention will appear from the following description.

Our investigations have disclosed that poorly dispersible powders of water-soluble milk components and a fat, such as whole milk powder, can be converted into instantly dissolving products by the application of certain surface active agents to the surface of the particles of the powder. An important feature of the invention is to cover the surface of the powder particles and distribute the surface active agent so that substantially all of the fat that is adjacent to the particle surfaces is covered with the surface active agent. The amount and the type of surface active agent and other features of the invention are discussed hereinafter.

Powders treated by our process acquire a degree of self-dispersion unattainable by prior processes. Moreover, the balling-up, churning and storage reversion defects that detract from the utility of products manufactured by alternate processes are substantially eliminated. Powders treated by our process exhibit dispersibility characteristics that compare favorably with agglomerated non-fat milk powders under the most rigorous test conditions.

The type of surface active agent utilized exerts a marked effect upon the properties of the powder and hence we prefer to use a phosphatide as the surface active agent. Vegetable phosphatidic material may be recovered from various seeds in which they occur in association with vegetable oils, e.g., commercial soybean oil and corn oil. A portion of the phosphatides is usually removed from the seeds along with the oil when the seeds are processed either with solvents or by pressing. Crude vegetable oils therefore comprise an excellent source of vegetable phosphatides which may be recovered from the oils by precipitation with water, electrolytes in aqueous solution, alcohol, etc. The separated phosphatides are in crude form and contain many other materials and hence, they may be purified by known procedures as desirable or necessary. Phosphatides obtained from animal sources such as egg and milk are also suitable for use as surface active agents in the present invention. The preferred phosphatides are the monoamino phosphatides, lecithin and cephalin, because they afford the advantages of good dispersibility and persistence, as explained hereinafter. Another reason for preferring monoamino phosphatides, notably the lecithins, in the present invention is their natural occurrences in food products and the resulting enhancing of the food value of the product. Inositol-containing phosphatides, which are frequently associated with the cephaline phosphatides, may also be used. Such materials are described in a book entitled "The Phosphatides" by Wittcoff, Rheinhold Publishing Company, 1951.

Other useful surface active agents include the esters of polyhydric alcohols and long chain, i.e., 12 to 24 carbon atom fatty acids. Moreover, mixtures of such surface active agents may be used. However, in selecting a suitable surface active agent or mixture thereof, it is important that the material have an appropriate hydrophile-lipophile balance (HLB). The HLB is a value expressing the relative simultaneous attraction of the surface active agent for water and for oil (for example in the two phases of a system to be emulsified). Surface active agents have molecules that contain both hydrophilic and lipophilic groups and it is the balance of the size and strength of these two opposing groups that determines the HLB. The various surface active agents are tested in various oil-water systems, their emulsifying power is observed, and they are assigned HLB values accordingly. A material that is predominantly lipophilic in character is assigned a low HLB number, and a material that is predominantly hydrophilic in character is assigned a high number.

When two or more emulsifiers are combined or blended, the HLB values are additive in behavior. Thus, if we blend three parts of emulsifier "A" having an HLB of 8 and one part of an emulsifier "B" having an HLB of 16, the resulting HLB of the blend will be the sum of three-quarters of 8 and one-quarter of 16, i.e. (6+) or 10. The nature of the HLB and its measurement are described in the Journal of the Society of Cosmetic Chemists, vol. I, No. 5, December 1949, by William C. Griffin, and in a brochure of the Atlas Powder Company, "Atlas Surface Active Agent," 1950.

The HLB of materials such as polyoxyethylene sorbitan monolaurate (known in the trade as "Tween 20") may range as high as 16.7, depending upon the number of oxyethylene groups per molecule. This material used alone as a surface active agent is not effective for improving the dispersibility of whole milk powder. Moreover, other materials such as sorbitan tristearate (otherwise known as "Span 65") having an HLB of about 2.1 when used alone is not suitable for preparing rapidly dispersible whole milk powders according to the present invention. However, within these two extremes there is a range of suitable surface active agents. Furthermore, by mixing two such surface agents of the extreme set forth above to produce a mixture which has an HLB in an intermediate range, an operative material may be obtained for the purposes of the present invention. For example, sorbitan monolaurate ("Span 20") has an HLB of 8.6 and is suitable for treating whole milk powder. Other materials within this preferred class include the glycerol mannitan laurate having an HLB of 7.1. Polyoxyethylene sorbitan monooleate, otherwise known as "Tween 81," is also very effective and has an HLB of 10.0 Polyoxyethylene sorbitol hexaoleate has an HLB of 10.2 and is also very satisfactory. Another very satisfactory material is glyceryl monooleate ("Myverol 18–71").

Another group of materials which is still satisfactory but not as effective as the group previously described for treating whole milk powder, includes polyoxyethylene sorbitan trioleate, otherwise known as "Tween 85" having an HLB of 11.0, polyoxyethylene sorbitol cottonseed oil derivative having an HLB of 4.2, polyglyceryl oleate, and diacetyl tartaric acid ester of a mono- di-glyceride mixture.

Still other surface active agents which provide advantages over the prior art although they are not within the preferred classes described above, are sorbitan monooleate ("Span 80") having an HLB of 4.3, polyoxyethylene lauryl alcohol, otherwise known as "Brij 30" having an HLB of 9.5, polyoxyethylene sorbitan monopalmitate ("Tween 40") having an HLB of 15.6, polyoxyethylene sorbitan monostearate ("Tween 60") having an HLB of 14.9, polyoxyethylene sorbitan monooleate ("Tween 80") having an HLB of 15.0, and polyethylene glycol ("Carbowax 1500").

The persistence of the dispersibility effect imparted by the surface active agent is important in most applications. We have observed that persistence may vary considerably with the type of surface active agent and recognize the superiority of the monoamino-mono-phosphatides, particularly the lecithins in this regard. The application of lecithin according to our invention affords dispersibility improvement and persistence for periods in excess of six months at storage temperatures of 04–100° F.

The amount of surface active agent needed is a function of the total surface of the powder to be coated, and the efficiency with which the coating operation is executed, as well as the characteristics of the surface active agent and the powder itself. Generally, we have succeeded in imparting satisfactory dispersibility to powders of the type with which we are concerned by using at least about 0.2% of a surface active agent based on the dry weight of the powder. Preferably, we use approximately 0.5% of surface active agent. Although larger amounts of agent than those specified were also effective, we prefer to limit the quantity of agent for reasons of economy and flavor retention to not greater than about 3.0%, more preferably to a maximum of 1.0%.

Although the invention is not limited to any particular theory, we believe that the reason for the failure of known procedures to produce satisfactory dispersibility of fat-containing powder is due to the presence of small amounts of free fat on the surface of the particles. Such surface fat impedes wetting and dispersibility. Moreover, the attempts of prior investigators to improve dispersibility by incorporating surface active agents into the particles have been unsuccessful, because we believe the surface active agent is needed not in the interstices of the particles, but at the surface. In conventionally dried powders, the major portion of natural phosphatides or surface active agents introduced before drying are lost within the particle interior or occluded within particle aggregates and are thereby rendered ineffective, or the particles of fat become deemulsified during the drying process with the result that the fat appears at the particle surface. Hence, the present invention provides that the surface active agent is applied on the exterior surfaces of the particles and in amounts sufficient to produce the desired result. When using lecithin, as preferred for treating whole milk powder, the amount of lecithin used, e.g., 0.5% based on the weight of the powder, is twice the natural lecithin content of the milk.

Furthermore, the particles of water-soluble milk components when wet may tend to dissolve too rapidly due to the higher rate of solution of very fine particles. The material therefore becomes encapsulated in gummy viscous shells of the soluble material, which stubbornly resist complete solution unless extremely vigorous agitation is maintained. Hence, in order to produce dispersible powders that meet the criteria of the present invention, the powdered material, if it is not already formed of particles having the desired size, is agglomerated to produce aggregates or agglomerates within the desired size range. By forming such fine particles into larger aggregates or agglomerates, the undesirably high solution rate of the fine particles is modified so that they do not tend to go into solution with excessive speed nor to encapsulate other portions of the powder. Particles of the desired size may be manufactured by any method known to the art including spray drying, roller drying or tray drying, as well as by agglomerating methods currently available. Particles in the 10–50 micron size range acquire slight dispersibility when treated by the method described herein. However, some mechanical agitation is required to produce total solution and the formation of difficulty dispersible wet lumps is unavoidable. There is no precise upper limit on particle size because we have produced powders having particle size larger than 2000 microns diameter with satisfactory dispersibility. However, where rapid dissolution of the dispersed wetted particle is essential, an intermediate particle size range is to be preferred. Furthermore, we prefer the higher bulk density of the intermediate particle size powders for economy of packaging, handling transportation, etc., and therefore prefer to process powders with particles in the 100–500 micron diameter range.

Other than whole milk powder, the treatment of which is a preferred object of the invention, powders comprising water-soluble milk components and a fat may be successfully treated by our process. Such water-soluble milk components include, for example, casein, the ingredients of whey, and sugars such as lactose. The amount of these components generally will be determined by the particular use of the material. However, in all cases, the amount thereof is such that if the material were in a very fine particle size on the order of 10 to 50 microns, the rapid solution of the water-soluble component would seriously interfere with the complete solution of the mixture, by the formation of layers of gummy or viscous material around the other portions of the substantially dry powder. The fatty material will most frequently be butterfat. However, substitute fats, such as cocoanut oil as illustrated in the following examples, may be used instead of the butterfat.

The problem of dispersibility generally arises in connection with powdered materials containing at least about .02 percent of surface fat (as percent by weight of powder) in which the fat melts at a temperature above that of the water that is used for reconstitution. Hence, the invention is directed to improving the dispersibility of powdered materials containing at least about .02 percent of surface fat in which the fat melts above the temperature of the water that is to be used for reconstitution, i.e., usually cold water. Modified milks containing substitute fats or altered protein, vitamin or mineral balance, such as those commonly used for infant feeding, and analogous formulations for animal feed preparations, also fall within the province of the invention for improving the powder dispersibility. Powdered ice cream mixes, powders of varying fat content, including powdered ice milk, and fat rich ice cream powders respond equally well to the treatment for dispersibility improvement.

Any of a number of procedures may be used for applying the surface active agent to the powder. One procedure is to dissolve the agent in a volatile non-aqueous solvent vehicle such as pentane or hexane and spray such a solution on the powder, usually with some mechanical mixing, and then remove the solvent by evaporation. Another method is to apply the agent by mechanical blending as illustrated by Examples 2 and 3 hereinafter. If the viscosity of the surface active agent is sufficiently low it is possible to apply the agent by mechanical blending without the use of a carrier or solvent. The mechanical blending procedure tends to be less efficient and requires higher levels of amounts of surface active agent. Still another procedure is to carry out the application of the surface active agent and the agglomeration of the powder simultaneously, either by known procedures wherein the powder, while suspended in air, is treated with an agglomerating liquid (which in the present instance would also contain the surface active agent) or by the procedure disclosed in the copending application of Sullivan and Spiess Serial No. 684,209, filed September 16, 1957, now Patent No. 3,042,526 issued July 3, 1962.

The following examples are intended to illustrate the various features of the invention, without, however, limiting its scope.

*Example 1*

400 lbs. of a poorly dispersible spray dried whole milk powder of 26% butterfat content and having an average particle size of 20 microns were injected in a high velocity air stream into an agglomerating chamber where it was simultaneously sprayed with a 4% soybean lecithin-water emulsion from an indepentently operated spray nozzle. The lecithin was commercial grade product having the following composition:

| | Percent |
|---|---|
| Chemical lecithin | 60 |
| Chemical cephalin | 30 |
| Inositol phosphatides | 2.2 |
| Soybean oil | 4.0 |
| Miscellaneous | 3.8 |

The procedure was carried out by the technique disclosed in the Sullivan and Spiess application Serial No. 684,209, now Patent No. 3,042,526 issued July 3, 1962. The emulsion and powder feed rates were so proportioned as to rehydrate the powder to 15% moisture content. The wet powder was then conveyed to a granulator for particle sizing and then to a vibratory warm air dryer where the moisture content was reduced to a level of approximately 3%. The final product, containing 0.6% lecithin distributed predominantly on the powder surface, displayed 100% static dispersibility in water at 5° C. by the following testing method:

14 grams of the treated powder, at 5° C., are placed on the surface of 100 cc. of refrigerated water at the same temperature, conditions likely to be simulated in consumer use. The water is contained in a vessel presenting 5.8 square inches of water surface to the powder. Dispersion is allowed to proceed without agitation for two minutes, and the undispersed floating solids are then separated from the subnatant solution which is subsequently analyzed for total solids. Dispersibility is expressed as the percent of total available solids dispersed statically in two minutes.

*Example 2*

A series of six parallel tests on the dispersibility of powdered whole milk samples containing 26% butterfat was carried out under different conditions as follows. In Test No. 1 the powder was a spray dried whole milk powder of 20 micron average particle diameter. No surface active agent was used in the powder nor in the water in which it was attempted to be dispersed. Test No. 2 was carried out on a sample of whole milk powder containing 1% lecithin. The lecithin, however, was added before spray drying and the average particle diameter was 20 microns. In Test No. 3, the lecithin was added to the milk in the amount of 1% (based on milk solids) before spray drying. The powder was then agglomerated to 300 microns average diameter. In Test No. 4, the spray dried whole milk powder was agglomerated to 300 microns particle size but no surface active agent was used. In Test No. 5, the agglomerated spray dried whole milk powder of 300 microns average particle diameter was attempted to be dispersed in water containing 1% of a water soluble surfactant (alkyl aryl polyether alcohol) in solution. In Test No. 6, whole milk powder of approximately 300 microns diameter was blended with a solution of commercial soybean lecithin in hexane by spraying the solution on the powder and then mechanically mixing the composition. The solution contained 23 parts of lecithin per 200 parts of hexane and a sufficient amount was used to add 0.5% lecithin based on the powder. The hexane was then evaporated in a warm air stream leaving a deposit of lecithin on the powder surface. Static dispersibility tests of the six powders were carried out in water at 5° C. The degree of dispersion was noted after 10 seconds and also at 2 minutes after first contact of the powder with the water. The following quantitative observations were made. In Test No. 1, substantially no milk powder had dispersed at 10 seconds, and less than 10% solids had dispersed after 2 minutes. In Test No. 2, practically no particles had dispersed after 10 seconds and less than 10% solids had dispersed at the 2 minute observation. In Test No. 3, only a few particles had dispersed at 10 seconds, and only about 15% solids had dispersed at 2 minutes. In Test No. 4, substantially no powder had dispersed at 10 seconds and after 2 minutes no increase in dispersion could be noted. In Test No. 5, a few particles dispersed in 10 seconds, but at the 2 minute observation, less than 10% solids had dispersed. In Test No. 6, substantially 100% of the milk solids had dispersed in 10 seconds, i.e., the dispersion of the powder in the water was substantially instantaneous.

*Example 3*

10 lbs. of agglomerated whole milk powder of approximately 200 microns average particle diameter, containing 26% butterfat, were mechanically blended with a solution of 114 grams of soybean lecithin in an equal amount of soybean oil. Mixing was effected by tumbling the powder with the surface active agent at a temperature of approximately 100° F. to lower the viscosity and facilitate spreading. In this instance, the efficiency of coating was not as great as in the previous examples, thereby requiring the use of the greater amount of surface active agent, i.e., 2.5%. However, the final product was substantially instantaneously dispersible in cold water, i.e., 5° C. Other non-volatile edible carriers besides the soybean oil may be used.

*Example 4*

Powdered cream containing 50% butterfat was agglomerated by water using the process of Sullivan and Spiess described in the copending application Serial No. 684,209, now Patent No. 3,042,526 issued July 3, 1962. The amount of agglomerating liquid was sufficient to produce an agglomerated product having 15% moisture content. The material was then redried. 10 pounds of the agglomerated powder, having an average particle diameter of 200 microns, was blended with 200 grams of hexane containing 23 grams of soybean lecithin (by mechanical tumbling as described in Example 3). After evaporation of the hexane solvent, a powdered cream coated with 0.5% lecithin was obtained. The product had substantially 100% instantaneous dispersibility in ice water. The cream powder prior to the treatment described possessed a static dispersibility value of 0%.

*Example 5*

By the procedure described in Example 4, a medium fat whole milk powder of 14% butterfat content was coated with 0.25%–3.0% of the surface active agent. The product had rapid dispersibility in cold water. This example illustrates the applicability of the invention to milk powders containing fat in an amount less than whole milk but still sufficient to suppress its dispersibility in water at a temperature below the melting point of the fat.

*Example 6*

A powdered ice cream mix having the following formulation was spray dried:

|   | Percent |
|---|---|
| Fat | 25.6 |
| Milk solids-non fat | 28.2 |
| Cane sugar | 35.8 |
| Corn sugar solids | 7.7 |
| Stabilizer | 0.2 |
| Emulsifier | 0.1 |

The dried powder was then agglomerated and coated with lecithin by the procedure illustrated in Example 4. A powder was obtained that was 100% instantly dispersible in ice water.

*Example 7*

Using alcohol insoluble phosphatides of the following formulation

|   | Percent |
|---|---|
| Chemical lecithin | 4.0 |
| Chemical cephalin | 28.5 |
| Inositol phosphatides | 55.0 |
| Soybean oil | 4.0 |
| Miscellaneous | 8.5 | in the form of a hexane solution, a whole milk powder having particles which passed a U.S. No. 10 screen but were retained on the U.S. No. 50 screen were coated with 1.0% of such phosphatides, by the procedure described in Example 4. Static dispersibility tests were then carried out using the powder at 5° C. and water at 5° C. and 20° C. The dispersibility was 38% in the 5° C. water and 85% in the 20° C. water.

Following the procedure described in Example 4, whole milk powder was treated with various surface active agents in the amounts of 1% or 0.5%, and static dispersibility tests were made on the treated powders. The particle size of the powders was such that it passed a U.S. No. 10 screen but was retained on a U.S. No. 50 screen. The results are presented in the following table. The notation "5° C./5° C." means that both the powder and the water were at 5° C., whereas the notation "5° C./20° C." means that the powder was at 5° C. but the water was at 20° C.

INFLUENCE OF SURFACTANT COATING ON DISPERSIBILITY OF WHOLE MILK POWDER

| Example No. | Name of Compound | Trade Name | HLB value | Surfactant Coating, Percent | Static Dispersibility 5° C./5° C. Percent | Static Dispersibility 5° C./20° C. Percent |
|---|---|---|---|---|---|---|
| 8 | Sorbitan monolaurate | "Span 20" | 8.6 | 1 | 33 | 100 |
| 9 | Glycerol mannitan laurate | NNO | 7.1 | 1 | 40 | 100 |
| 10 | POE [1] Sorbitan monooleate | "Tween 81" | 10.0 | 1 | 33 | 100 |
| 11 | POE [1] Sorbitol hexaoleate | G-1086 | 10.2 | 1 | 26 | 88 |
| 12 | Glyceryl monooleate | "Myverol 18-71" |  | 1 | 92 | 95 |
| 13 | do | "Myverol 18-71" |  | 0.5 | 20 | 23 |
| 14 | Polyunsaturated monoglycerides | DPI |  | 1 | 33 | 72 |
| 15 | POE [1] Sorbitan trioleate | "Tween 85" | 11.0 | 1 | 7 | 60 |
| 16 | POE [1] Sorbitol cottonseed oil deriv | G-931 | 4.2 | 1 | 11 | 59 |
| 17 | Sorbitan trioleate plus POE [1] Sorbitan monooleate | "Span 85" plus "Tween 80" | 5.8 | 0.7+0.3 | 27 | 52 |
| 18 | Polyglyceryl oleate | "Emcol 14" |  | 1 | 11 | 62 |
| 19 | Diacetyl tartaric acid ester of a mono-diglyceride mixt. | Solvit A |  | 1 | 11 | 52 |
| 20 | Sorbitan monooleate | "Span 80" | 4.3 | 1 | 38 | 46 |
| 21 | POE [1] lauryl alcohol | "Brij 30" | 9.5 | 1 | 15 | 40 |
| 22 | POE [1] sorbitan monopalmitate | "Tween 40" | 15.6 | 1 |  | 29 |
| 23 | POE [1] sorbitan monostearate | "Tween 60" | 14.9 | 1 |  | 33 |
| 24 | POE [1] sorbitan monooleate | "Tween 80" | 15.0 | 1 |  | 29 |
| 25 | Polyethylene glycol | "Carbowax 1500" |  | 1 |  | 26 |

[1] Polyoxyethylene.

Although specific embodiments of the invention have been illustrated and described, we intend to include within the scope of the appended claims all modifications to and equivalents thereof.

We claim:

1. A powder comprising water-soluble milk components, a fat, and a surface active agent, the particle size of the powder being at least 100 microns diameter, the amount of surface active agent being at least 0.2% based on the weight of the powder, said amount being distributed over the surface of the particles, the fat adjacent the particle surfaces being covered with said agent, said agent having an intermediate hydrophile-lyophile balance with in the range of greater than 2.1 to less than 16.7, such that the powder disperses rapidly in water at a temperature below the melting point of the fat.

2. The powder described in claim 1 wherein the surface active agent is a phosphatide.

3. The powder described in claim 2 wherein the phosphatide is a monoamino monophosphatide.

4. The powder described in claim 2 wherein the phosphatide is lecithin.

5. The powder described in claim 2 wherein the phosphatide is cephalin.

6. The powder described in claim 1 wherein the surface active agent is sorbitan monolaurate.

7. The powder described in claim 1 wherein the surface active agent is glycerol mannitan laurate.

8. The powder described in claim 1 wherein the surface active agent is polyoxyethylene sorbitan monooleate.

9. The powder described in claim 1 wherein the surface active agent is polyoxyethylene sorbitol hexaoleate.

10. The powder described in claim 1 wherein the surface active agent is polyoxyethylene glyceryl monooleate.

11. The powder described in claim 1 wherein the surface active agent is an ester of a polyhydric alcohol and a fatty acid having 12–20 carbon atoms.

12. The powder described in claim 1 wherein the amount of the surface active agent is at least about 0.2% and not more than 3.0% based on the dry weight of the powder.

13. The powder described in claim 1 wherein the amount of the surface active agent is at least about 0.5% and not more than 1.0% based on the dry weight of the powder.

14. The powder described in claim 13 wherein the surface active agent is lecithin.

15. The powder described in claim 1 having an average particle diameter in the approximate range of 100–500 microns.

16. A powdered whole milk having the qualities set forth in claim 1.

17. A powdered cream having the qualities set forth in claim 1.

18. A powdered ice cream mix having the qualities set forth in claim 1.

19. A method of preparing a powder of water-soluble milk components and a fat, at least a portion of said fat being adjacent the particle surfaces, that is rapidly dispersible in water at a temperature below the melting point of the fat, which comprises covering the surface of the particles with a surface active agent having an intermediate hydrophile-lypophile balance within the range of greater than 2.1 to less than 16.7, in an amount of at least 0.2% based on the weight of the powder, said minimum amount being distributed over the surface of the powder particles so that substantially all of the fat adjacent the particle surfaces is covered with said agent, the particle size of the product being at least 100 microns diameter.

20. The method described in claim 19 wherein the surface active agent is a phosphatide.

21. The method described in claim 19 wherein the surface active agent is lecithin.

22. The method described in claim 19 wherein the surface active agent is an ester of polyhydric alcohol and a fatty acid having 12–24 carbon atoms.

23. The method described in claim 19 wherein the amount of surface active agent is in the approximate range 0.2–3.0%.

24. The method described in claim 19 wherein the amount of surface active agent is in the approximate range 0.5–1.0%.

25. The method described in claim 19 wherein the powder is powdered whole milk.

26. The method described in claim 19 wherein the powder is powdered cream.

27. The method described in claim 19 wherein the powder is powdered ice cream mix.

28. The method described in claim 19 wherein the surface active agent dispersed in an aqueous medium is applied to the powder while the latter is dispersed in a gas.

29. The method described in claim 19 wherein the surface active agent dispersed in a volatile organic solvent is applied to the powder.

30. The method described in claim 19 wherein the surface active agent is mechanically mixed with the powder.

31. The method of making milk product particles easily dispersible in water, which comprises dissolving lecithin in a volatile organic solvent, mixing the lecithin solution with the milk product particles at room temperature in an amount of 0.2% to 3% of lecithin, by weight of the milk product, and subsequently evaporating the solvent whereby the milk product particles are coated with lecithin.

References Cited by the Examiner

UNITED STATES PATENTS

| | | | |
|---|---|---|---|
| 1,928,135 | 9/1933 | Peebles et al. | 99—203 |
| 2,016,592 | 10/1935 | Chuck | 99—203 |
| 2,399,565 | 4/1946 | North | 99—56 |
| 2,611,708 | 9/1952 | Owens | 99—166 |
| 2,719,792 | 10/1955 | Rollins | 99—166 |
| 2,819,971 | 1/1958 | Gunthardt | 99—166 |
| 2,953,458 | 9/1960 | Sjollema | 99—56 |

FOREIGN PATENTS

| | | |
|---|---|---|
| 7,904 | 2/1897 | Great Britain. |
| 9,343 | 6/1916 | Great Britain. |

OTHER REFERENCES

Food Manufacture, vol. XVI, No. 2, February 1941, p. 27.

A. LOUIS MONACELL, *Primary Examiner*.

A. H. WINKLESTEIN, R. S. AULL, A. ISAACS, M. W. GREENSTEIN, *Assistant Examiners*.